(12) United States Patent
Decker

(10) Patent No.: US 11,022,515 B2
(45) Date of Patent: Jun. 1, 2021

(54) SNIFFER LEAK DETECTOR WITH DISTANCE-DEPENDENT CONTROL OF THE CARRIER GAS FLOW

(71) Applicant: INFICON GmbH, Cologne (DE)

(72) Inventor: Silvio Decker, Cologne (DE)

(73) Assignee: INFICON GmbH, Cologne (DE)

( * ) Notice: Subject to any disclaimer, the term of this patent is extended or adjusted under 35 U.S.C. 154(b) by 156 days.

(21) Appl. No.: 16/330,902

(22) PCT Filed: Sep. 28, 2017

(86) PCT No.: PCT/EP2017/074680
§ 371 (c)(1),
(2) Date: Mar. 6, 2019

(87) PCT Pub. No.: WO2018/065298
PCT Pub. Date: Apr. 12, 2018

(65) Prior Publication Data
US 2019/0212221 A1   Jul. 11, 2019

(30) Foreign Application Priority Data

Oct. 6, 2016 (DE) ..................... 10 2016 219 401.1

(51) Int. Cl.
*G01M 3/20* (2006.01)
(52) U.S. Cl.
CPC .................. *G01M 3/205* (2013.01)
(58) Field of Classification Search
CPC ..................................................... G01M 3/205
See application file for complete search history.

(56) References Cited

U.S. PATENT DOCUMENTS

| | | | | |
|---|---|---|---|---|
| 3,950,739 A | * | 4/1976 | Campman | G01M 3/20 340/628 |
| 4,477,986 A | * | 10/1984 | Marshall | G01M 3/04 73/40.7 |
| 4,580,443 A | * | 4/1986 | Marshall | G01M 3/202 73/40.7 |
| 4,617,821 A | * | 10/1986 | Yokoyama | G01N 33/4972 362/253 |
| 4,898,021 A | * | 2/1990 | Weaver | G01M 3/202 165/11.1 |
| 5,417,105 A | * | 5/1995 | Martinez | G01M 3/205 73/40.7 |

(Continued)

FOREIGN PATENT DOCUMENTS

| | | |
|---|---|---|
| CN | 101263377 A * | 10/2008 |
| DE | 102007043382 A1 | 3/2009 |

(Continued)

*Primary Examiner* — John Fitzgerald
(74) *Attorney, Agent, or Firm* — The Webb Law Firm

(57) ABSTRACT

A sniffer leak detector is provided herein, including a sniffer probe and a vacuum pump which are connected to each other by a gas flow path, a gas analyzer arranged along the gas flow path and analyzes the gas taken in by the vacuum pump through the sniffer probe. The sniffer leak detector further includes a distance sensor that detects the distance between the sniffer probe and the test object, and a control is linked to the distance sensor. The control is designed to vary the carrier gas flow transported along the gas flow path, depending on the measured distance.

9 Claims, 2 Drawing Sheets

(56) References Cited

U.S. PATENT DOCUMENTS

| | | | |
|---|---|---|---|
| 7,159,445 B2 * | 1/2007 | Bohm | G01M 3/205 |
| | | | 73/23.2 |
| 8,353,223 B2 * | 1/2013 | Bunker | G01N 1/22 |
| | | | 73/864.33 |
| 2004/0050188 A1 * | 3/2004 | Richards | G08B 13/19621 |
| | | | 73/866.3 |
| 2004/0154379 A1 * | 8/2004 | Enquist | G01M 3/20 |
| | | | 73/40.7 |
| 2004/0194533 A1 * | 10/2004 | Bohm | G01M 3/205 |
| | | | 73/23.34 |
| 2008/0000288 A1 | 1/2008 | Bley | |
| 2010/0253376 A1 * | 10/2010 | Grosse Bley | G01M 3/205 |
| | | | 324/754.01 |
| 2010/0294026 A1 | 11/2010 | Wetzig et al. | |

FOREIGN PATENT DOCUMENTS

| | | |
|---|---|---|
| JP | 200150852 A | 2/2001 |
| WO | 2006069877 A1 | 7/2006 |

* cited by examiner

SNIFFER LEAK DETECTOR WITH DISTANCE-DEPENDENT CONTROL OF THE CARRIER GAS FLOW

CROSS-REFERENCE TO RELATED APPLICATIONS

This application is the United States national phase of International Application No. PCT/EP2017/074680 filed Sep. 28, 2017, and claims priority to German Patent Application No. 10 2016 219 401.1 filed Oct. 6, 2016, the disclosure of each of which is hereby incorporated by reference in its entirety.

BACKGROUND OF THE INVENTION

The disclosure relates to a device and a method for sniffer leak detection using a sniffer probe.

The sniffer probe is connected to a vacuum pump via a gas flow path, the pump generating a gas pressure that is reduced with respect to the surroundings of the sniffer probe. Thereby, gas is drawn in from the surroundings of the sniffer probe through an intake opening at a sniffing tip of the sniffer probe and is conveyed to the vacuum pump along the gas flow path. Gas drawn in by the sniffer probe is analyzed using a gas analyzer. A carrier gas flow is created thereby from the sniffing tip to the gas analyzer. The gas analyzer may e.g. analyze the drawn-in carrier gas flow for the presence of a test gas with which the test object has been filled before. Here, the test object is filled with test gas such that the gas pressure inside the test object is higher than the pressure outside the test object, so that test gas escapes through a possible leak in an outer wall of the test object. If the sniffer probe is passed along the surface of the test object and comes close to the leak, the test gas escaping from the leak is drawn in by the sniffer probe and is detected by the gas analyzer.

For a sniffer leak detection it is necessary to constantly maintain a carrier gas flow in the sniffing line so that test gas escaping from the leak is conveyed to the gas analyzer and so that the test gas flow escaping from the leak is detected in a defined manner and a quantitative measure for the leakage rate can be obtained thereby.

It is a particular feature that the concentration of test gas in the carrier gas flow drawn in by means of the sniffer probe decreases even in a constant carrier gas flow, if the distance between the sniffer probe and the leak increases or the (transversal) sniffing speed increases. Conversely, the test gas proportion in the drawn in gas flow increases as the distance decreases and the relative speed between the sniffer probe and the leak decreases. Therefore, measurements are comparable only if the same "sniffing parameters" have been used: distance, transversal speed, carrier gas flow.

If all sniffing parameters were known at any time, the measuring result would always be correct regardless of distance, speed and carrier gas flow.

Specifically, the distance from the leak is a parameter that can cause great difficulty in finding leaks at unknown sites, which is why a greater carrier gas flow would be desirable in case of large or still unknown distances (e.g. from leaks still hidden). With well localized leaks (short measuring distance), however, a small carrier gas flow is advantageous so as to be able to measure even very low leakage rates.

Therefore, it is an object of the disclosure to improve the detection of unknown leaks and to improve the detection limit for test gas when measuring low leakage rates.

SUMMARY OF THE INVENTION

According to the disclosure, a distance sensor is provided that is configured to measure the distance between the distance sensor and a test object along which the sniffer probe is passed. A control is provided and configured to detect the measured distance and to vary the carrier gas flow along the gas flow path from the sniffing tip to the vacuum pump in dependence on the distance detected. Here, a larger gas flow should be set for a greater distance than for a shorter distance. As long as the distance does not change, the carrier gas flow is maintained constant.

The distance sensor may be a mechanical sensor with a spring element and/or a magnetic contact or a mechanically operated electric switch. When the contact or switch is closed, a predetermined distance is assumed to have been detected. The signal of the distance sensor is transmitted to the electronic control, preferably by electronic means. As an alternative, the distance sensor may be an optical sensor or an acoustic sensor (ultrasonic sensor). The sensor may be configured to transmit and receive electromagnetic waves (e.g. radar).

The sensor may, in addition, also be configured to detect the relative speed with respect to the surface of the test object relative to which the sniffer probe is guided and moved. Alternatively or complementarily, a separate speed sensor may be provided in addition to the distance sensor. The speed sensor should also be configured to emit and receive electromagnetic waves (light, radio, sound). The calculation of the distance and/or the speed may be performed by electronics, e.g. by the control electronics, in a manner known per se, e.g. using the Doppler principle.

The control may be configured to act upon the vacuum pump and/or on a mechanically or electrically actuatable throttle arranged along the gas flow path. In the case of a vacuum pump, the control can set and change the pump's speed. In the case of a throttle, the control can set and change the flow resistance of the throttle.

The gas analyzer may be configured to analyze the gas conveyed by the carrier gas flow. As an alternative or complementarily, the gas analyzer may be configured to analyze the gas drawn in by the sniffer probe and conveyed via a second gas flow path. For this purpose, the gas analyzer may be arranged along the respective gas flow path. In the case of the second gas flow path, the same may be connected to a second vacuum pump. The amount of gas conveyed along the second gas flow path depends on the gas flow conveyed, in dependence on the distance, via the first gas flow path.

BRIEF DESCRIPTION OF THE DRAWINGS

Three embodiments of the disclosure will be explained in detail hereunder with reference to the Figures. In the Figures.

DESCRIPTION OF THE INVENTION

Figure 1:
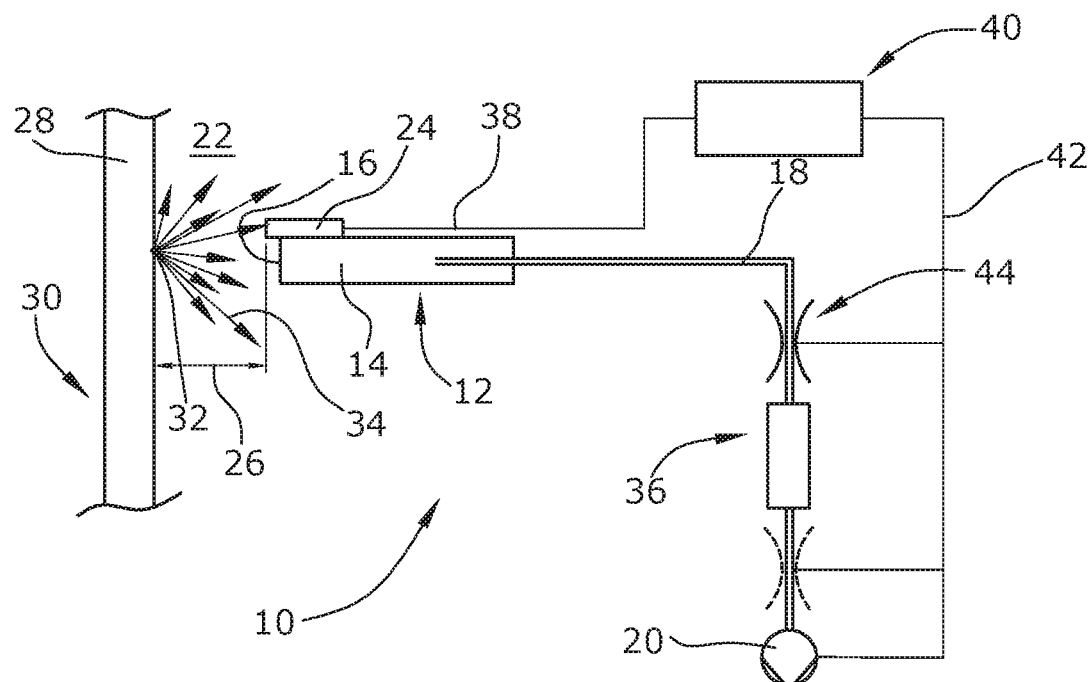
FIG. 1 shows a schematic illustration of the first embodiment.

First, the common features of the embodiments will be explained below.

The sniffer leak detector 10 comprises a sniffer probe 12, the sniffing tip 14 of which is provided with an intake opening 16 for drawing in a gas flow. The rear end of the sniffer probe 12 is connected to a first vacuum pump 20 via a first gas flow path 18. The first vacuum pump 20 is configured to generate a gas pressure that is reduced relative to the surroundings 22 of the sniffer probe 12. The vacuum pump 20 is designed as a gas conveyor pump and draws gas through the take-in opening 16 from the surroundings 22 and conveys the same along the gas flow path 18.

The sniffer probe 12 is provided with a distance sensor 24 arranged at the sniffing tip 14 in the region of the take-in opening 16. The distance sensor 24 is configured to detect the distance 26 from a surface 28 of a test object 30 in the vicinity of which the sniffer probe 12 is positioned to draw in test gas 34 escaping from a possible leak 32.

Gas drawn in by the sniffer probe 12 through the take-in opening 16 is supplied to a gas analyzer 36, which may e.g. be a mass spectrometer. The gas analyzer 36 is configured to detect test gas 34.

The distance 26 measured by the distance sensor 24 is transmitted to a control 40 via an electronic line 38. The control 40 may e.g. be a microcontroller or a computer. The control 40 is configured to change and adjust the gas flow conveyed along the first gas flow path 18 in dependence on the distance 26 measured. This may be effected in the following ways via an electric line 42:

The flow resistance of an adjustable throttle 44 arranged along the first gas flow path 18 is adjusted or changed by the control 40. If, as illustrated in FIG. 1, the gas analyzer 36 is arranged along the first gas flow path 18, the throttle 44 can be arranged between the sniffer probe 12 and the gas analyzer 36 and/or (as illustrate in broken lines in FIG. 1) between the gas analyzer 36 and the vacuum pump 20.

Alternatively or complementarily, the control 40 can adjust or vary the flow rate of the pump 20 via the line 42, e.g. by the control 40 adjusting the speed of the pump 20.

The differences between the embodiments will be explained below.

In FIG. 1, the gas analyzer 36 is arranged along the first gas flow path 18.

Figure 2:
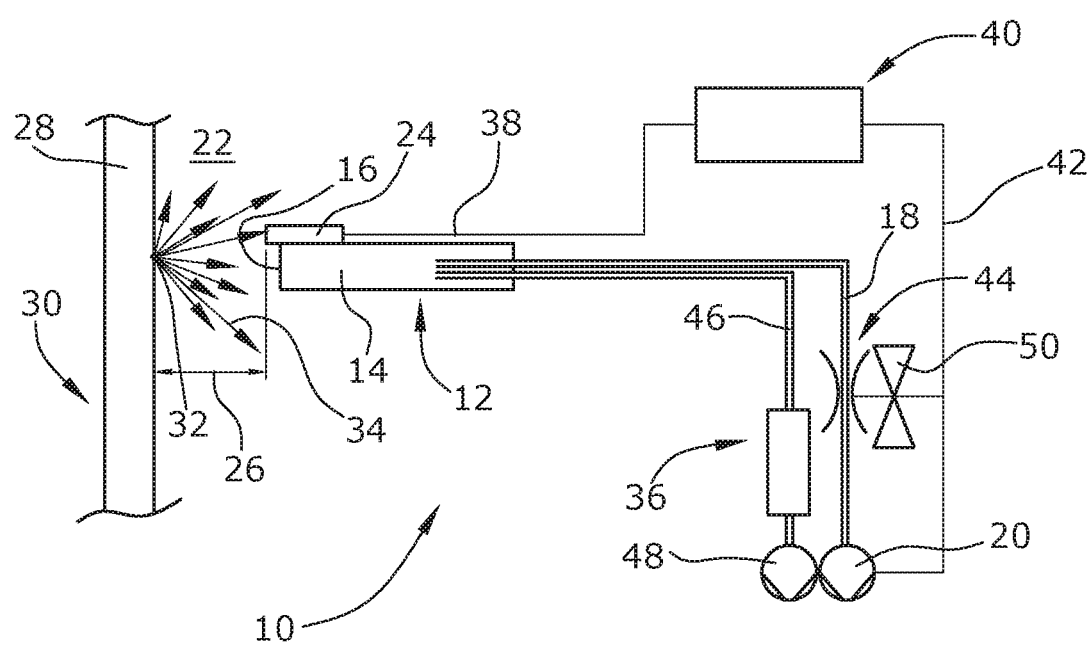
FIG. 2 shows a schematic illustration of the second embodiment.
Figure 3:
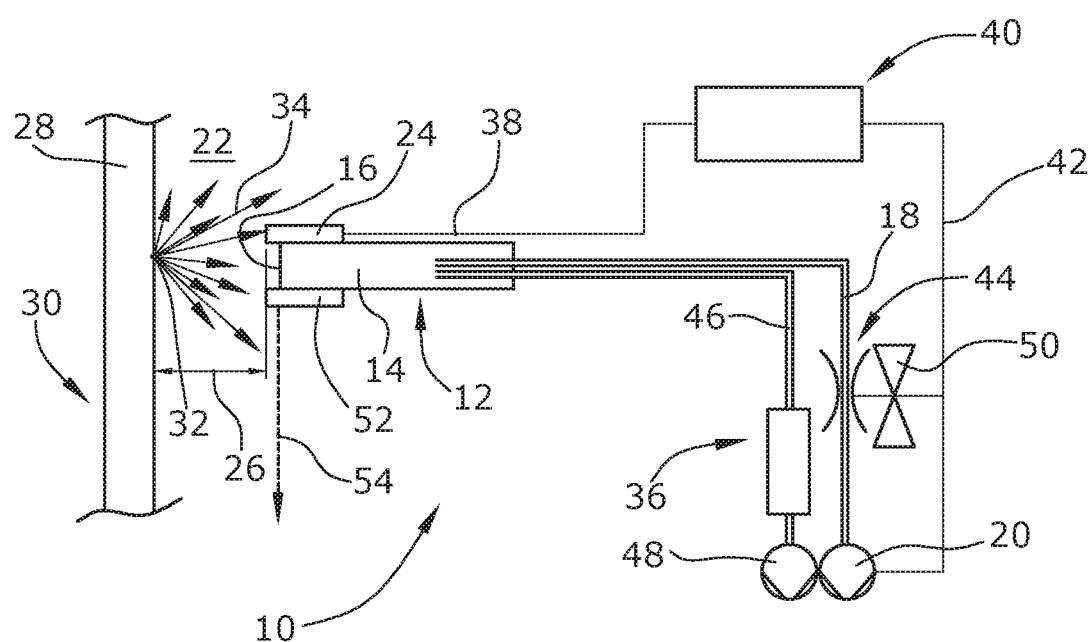
FIG. 3 shows a schematic illustration of the third embodiment.

In the second embodiment illustrated in FIG. 2 and in the third embodiment illustrated in FIG. 3, the gas analyzer 36 is arranged along a second gas flow path 46 different from the first gas flow path 18. The second gas flow path 46 connects the sniffer probe 12 to a vacuum pump 20 different from the first vacuum pump 20. The underlying idea is that the flow along the first gas flow path 18, adjusted by the control 40, at least indirectly also influences the flow conveyed along the second gas flow path 46 and the amount of gas conveyed along the second gas flow path 46, respectively.

In the second embodiment illustrated in FIG. 2 and in the third embodiment illustrated in FIG. 3, the control 40 can adjust or vary the flow resistance by means of a throttle corresponding to the throttle 44 of the first embodiment. As an alternative to the throttle 44, the first gas flow path 18 can comprise a valve 50 which, for purposes of illustration, is shown adjacent the throttle 44 in FIGS. 2 and 3 and which, similar to the throttle 44, can be actuated by the control 40 via the line 42. In the closed state of the valve 50, no gas is conveyed along the first gas flow path 18 so that all gas drawn in by the sniffer probe is supplied to the gas analyzer 36 via the second gas flow path 45. In the open state of the valve 50, only a part of the gas drawn in by the sniffer probe 12 reaches gas analyzer 36 via the second gas flow path 46, while another part of the gas drawn in is guided along the first gas flow path 18.

Alternatively or complementarily to the throttle 44 or the valve 50, the control 40 may, similar to the first embodiment, also act directly on the flow rate of the first vacuum pump 20 and may e.g. switch the same on or off. Similar to a closed valve 50, in the switched-off state of the first vacuum pump 20, the entire gas flow drawn in by the sniffer probe 12 is supplied to the gas analyzer 36 via the second gas flow path. Similar to an open valve 50, in the switched-on state of the pump 20, a part of the gas drawn in is conveyed via the first gas flow path 18, while another part is supplied to the gas analyzer 36 via the second gas flow path 46.

The third embodiment differs from the second embodiment in a speed sensor 52 separate from the distance sensor 24 and also arranged at the sniffing tip 14, the speed sensor being configured to measure the relative speed 54 of the sniffing tip 14 with respect to the surface 28. The speed measured is also transmitted to the control 40 via a line not illustrated in FIG. 3. The control 40 is configured to adjust or vary the gas flow guides along the first gas flow path 18 in the manners described above.

Figure 4:
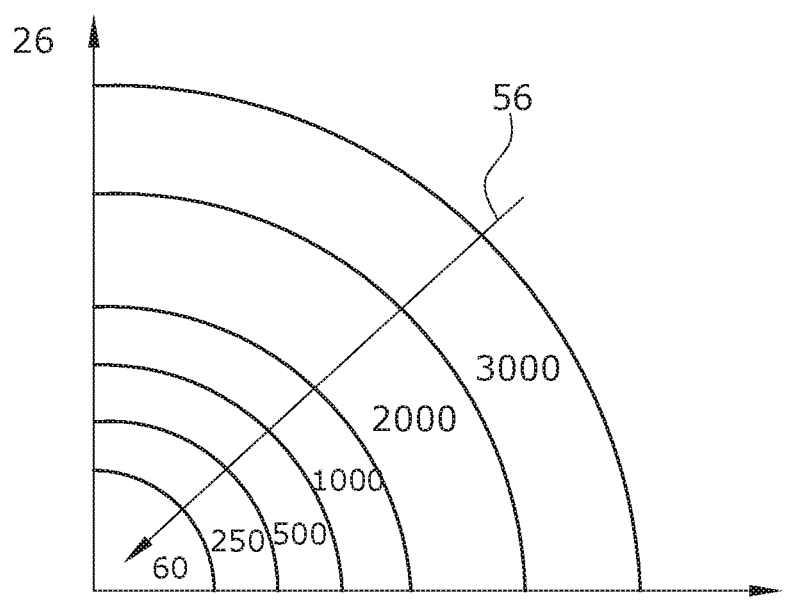
FIG. 4 shows a diagram illustrating the relationship between distance, speed and gas flow.

FIG. 4 shows the relationship between the distance 26, the relative speed 54 and the flow 56 along the first gas flow path 18 which is to be adjusted. The greater the distance 26 and/or the higher the speed 54, the lower the flow 56 has to be set in order to detect the same amount of test gas and to leave the test gas detection limit unchanged for a detection of a leak 32.

The invention claimed is:

1. A sniffer leak detector comprising a sniffer probe and a vacuum pump connected to each other via a gas flow path, and a gas analyzer is arranged along the gas flow path for analyzing the gas drawn in by the vacuum pump via the sniffer probe,
   a distance sensor configured to detect the distance between the sniffer probe and a test object, and a control is connected to the distance sensor, and is configured to vary a carrier gas flow conveyed along the gas flow path depending on the distance measured; wherein the control influences a flow rate of the vacuum pump by adjusting a speed of the vacuum pump and/or influences a flow resistance of a throttle arranged in the gas flow path.

2. The sniffer leak detector of claim 1, wherein the control influences the flow rate of the vacuum pump.

3. The sniffer leak detector of claim 1, wherein the control influences the flow resistance of a throttle arranged in the gas flow path.

4. The sniffer leak detector of claim 1, wherein the gas analyzer is arranged along the gas flow path between the sniffer probe and the vacuum pump.

5. The sniffer leak detector of claim 1, wherein the gas analyzer is arranged in a second gas flow path connected to the sniffer probe, and the gas flow of the second gas flow path is not influenced by the control.

6. The sniffer leak detector of claim 1, wherein a speed sensor is configured to measure a relative speed of the sniffer probe with respect to the test object, the control is further configured to control the gas flow depending on the speed measured.

7. A method for sniffer leak detection with a sniffer leak detector according to claim 1,
   comprising:
   measuring the distance between the distance sensor and a test object to be checked for a leak;

guiding the carrier gas flow along the gas flow path to be drawn in by the sniffer probe; and adjusting the carrier gas flow by the control depending on the distance measured.

8. The method of claim 7, further comprising monitoring the distance measured for a predefined period, and increasing the carrier gas flow if the distance increases and/or decreasing the carrier gas flow if the distance decreases.

9. The method of claim 7, displaying the amount of test gas detected, taking into account the measured distance and/or taking into account the adjusted carrier gas flow.

* * * * *

UNITED STATES PATENT AND TRADEMARK OFFICE
CERTIFICATE OF CORRECTION

PATENT NO. : 11,022,515 B2
APPLICATION NO. : 16/330902
DATED : June 1, 2021
INVENTOR(S) : Silvio Decker Page 1 of 1

It is certified that error appears in the above-identified patent and that said Letters Patent is hereby corrected as shown below:

In the Claims

Column 4, Line 36, Claim 1, after "probe," insert -- wherein --

Column 4, Line 60, Claim 6, after "object," insert -- and --

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*